United States Patent
Queen et al.

Patent Number: 5,394,834
Date of Patent: Mar. 7, 1995

[54] DISPOSABLE PET TOILETRY SYSTEM

[76] Inventors: Frankie A. R. Queen; Kevin R. Queen, both of 221 Three Oaks Dr., Lawrenceville, Ga. 30245

[21] Appl. No.: 129,784

[22] Filed: Sep. 29, 1993

Related U.S. Application Data

[63] Continuation of Ser. No. 865,452, Apr. 9, 1992, abandoned.

[51] Int. Cl.⁶ .............................................. A01K 1/03
[52] U.S. Cl. .............................. 119/168; 229/117.07; 383/4
[58] Field of Search ................................ 119/165, 168; 229/117.07, 123.3, 210, 212, 247; 383/4, 62, 203, 204

[56] References Cited

U.S. PATENT DOCUMENTS

| | | | |
|---|---|---|---|
| D. 310,588 | 9/1990 | Valinsky | D30/161 |
| 2,293,589 | 8/1942 | Calvert | 229/14 |
| 3,236,435 | 2/1966 | Nichols | 229/31 |
| 3,321,070 | 5/1967 | Childs | 206/46 |
| 4,235,065 | 11/1980 | Freeman | 53/472 |
| 4,480,747 | 11/1984 | Kazor et al. | 206/334 |
| 4,541,360 | 9/1985 | Higgins et al. | 119/168 |
| 4,553,671 | 11/1985 | Cheesman | 119/168 |
| 4,801,006 | 1/1989 | Martin et al. | 119/168 |
| 4,895,742 | 1/1990 | Schaub et al. | 383/4 |
| 5,007,530 | 4/1991 | Weismantel | 119/168 |
| 5,035,205 | 7/1991 | Schiller et al. | 119/168 |
| 5,080,043 | 1/1992 | Fields | 119/168 |
| 5,123,381 | 6/1992 | Salmon | 119/165 |

FOREIGN PATENT DOCUMENTS

| | | | |
|---|---|---|---|
| 2593670 | 8/1987 | France | 119/165 |
| 2608012 | 6/1988 | France | 119/168 |
| 2611666 | 9/1988 | France | 119/165 |
| 2737617 | 3/1979 | Germany | 119/168 |
| 8600191 | 1/1986 | WIPO | 119/165 |
| 8604777 | 8/1986 | WIPO | 119/168 |

OTHER PUBLICATIONS

Pre-Filled Disposable Litter Tray and Permanent Plastic Frame, Koos, Inc., 2 pg. brochure.
Litter Box Habits, Cat Fancy, Aug. 1989 issue, pp. 20-29.

*Primary Examiner*—Paul J. Hirsch
*Assistant Examiner*—Todd E. Manahan
*Attorney, Agent, or Firm*—Hopkins & Thomas

[57] ABSTRACT

The disposable pet utility system (10) for providing prepackaged absorbent cat litter and the like for household pet care, includes a container (11) having creases at each of its corners for collapsing the container about its contents during shipment and disposal, and for erection during use. The container (11) includes a top wall (40), having perforations and creases formed in the top wall (40) to allow sections (41) and (42) of the top wall to tear and separate from each other to fold back reversibly and to be positioned underneath the container (11) for a rigid support. After the contents of the container (11) have been used, the sections (41) and (42) of the top wall are resealed and the container (11) is collapsed so as to allow a compact and sanitary method of disposal.

1 Claim, 3 Drawing Sheets

DISPOSABLE PET TOILETRY SYSTEM

This is a continuation of application Ser. No. 07/865,452, filed on Apr. 9, 1992, now abandoned.

FIELD OF THE INVENTION

The present invention relates in general to a disposable pet utility system for use with household pets. More particularly, the invention relates to a container designed to provide disposable prepackaged absorbent cat litter and the like for household pet care.

BACKGROUND OF THE INVENTION

Approximately one-half of the households in the United States currently own pets, and cat owners alone comprise about 30% of all U.S. pet owners. Although cats are desirable household pets, pet care for cats is presently laborious, messy, time consuming and can be costly.

Typically, the current apparatus used for cat toiletry care comprises a basic container or pan. Cat pans normally are formed of plastic materials, but can be fabricated of metal, wood or any other materials, and are readily purchased in the marketplace. Such cat pans must have side walls low enough for the cat to easily enter and depart, yet the side walls must be high enough to contain loose, absorbent cat litter materials spread about from the cat's pawing and scratching motions.

The process of providing comfortable, sanitary toilet conditions for household cats can comprise several steps. Usually most households place a liner within the cat pan to maintain the pan's cleanliness and to contain the absorbent cat litter, and later the liner can be gathered with the absorbent cat litter from the pan and disposed of, which provides for ease of handling and disposing of the soiled absorbent cat litter after use. Liners generally are formed of a plastic material, however, many households use newspapers, scrap paper, and the like as liners. Once the cat pan and its liner are in place, granular absorbent cat litter is spread within the pan for absorbing cat urine and excrement. The amount of absorbent cat litter placed in the cat pan is currently estimated by the person filling the pan. When the absorbent cat litter has been used by the cat and the absorbent cat litter has reached its absorbent capacity, the absorbent cat litter and its liner are disposed of. After removal of the liner, the cat pan usually must be cleaned and sanitized prior to preparation and reuse of the cat pan.

Some disadvantages occur in the present method of cat toiletry and elimination of the cat's waste. One disadvantage of the present method is that the numerous steps involved in this process are time consuming and laborious. For example, the cat owner goes through the steps of purchasing a cat pan or a similar container, purchasing a pan liner, purchasing a bag of absorbent cat litter, installing the liner within or on the cat pan, filling the cat pan with the absorbent cat litter, storing the unused portion of absorbent cat litter in a dry place, disposing of the absorbent cat litter and liner after use, and cleaning up and sanitizing the cat pan prior to reuse. Therefore, this process can be inconvenient and time consuming.

Another problem in the present method of cat toiletry care concerns the use of the absorbent cat litter. Currently, absorbent cat litter is sold in heavy, cumbersome bags, usually available in incremental sizes of 10 pounds, 20 pounds or 25 pound bags. During the purchasing, handling and storing procedure of the heavy bags of absorbent cat litter, experience demonstrates that accidents are caused by lifting and carrying the heavy, awkward bags. Additionally, instructions on the bags of absorbent cat litter conventionally do not inform the user of the appropriate volume of absorbent cat litter to use in the cat pan, thereby causing the cat owner to use either an insufficient amount of absorbent cat litter or to waste cat absorbent cat litter. Moreover, particles of dust often are emitted from the large absorbent cat litter bag during the pouring of the absorbent cat litter from its bag and refilling of the pan, causing both discomfort and health risk to the cat owner and pollution of the user's environment. Thus, the present method of using absorbent cat litter can be undesirable.

Recently disclosed products have attempted to address these problems and disadvantages. One of such products is a Disposa-Box, manufactured by Pet Care Products, Inc. The Disposa-Box container comprises a corrugated cardboard box treated with chemicals to resist liquids and to prevent odors. A consumer would purchase the Disposa-Box in its closed, folded state and would open the top and erect the side walls of the box. This provides an open top cat pan. No liner is included with the Disposa-Box and the user separately purchases the absorbent cat litter and pours approximately a week's portion of absorbent cat litter from a bag into the box for the cat to use. Once the cat has utilized this absorbent cat litter for a period of time, the box and its contents are discarded in the box's erected position.

In the U.S. Design Pat. No. 310,558 of Valinsky, a rectangularly-shaped disposable cat litter pan is shown having an open top wall and a handle on one side of the pan. The handle allows a pet owner to grip the pan so as to move the pan or carry the pan more conveniently. Similar to the Disposa-Box container, no liner is included with the litter pan, and no absorbent cat litter is prefilled in the litter pan of Valinsky.

Another product currently on the market is a disposable litter kit fabricated by Koos, Inc., named LeJon. The LeJon litter kit combines a permanent plastic frame with a disposable corrugated cardboard convertible container, which is prefilled with absorbent cat litter. A consumer purchases the corrugated cardboard box pan in its collapsed state filled with absorbent cat litter and constructs the pan using pressure-sensitive tape at each of the corners of the pan to maintain rigidity of the pan in its erected position. The permanent plastic frame is then mounted over and about the pan at its upper edges. After the cat uses this pan assembly for a period of time, the permanent plastic frame detaches from the upper edges of the pan and the cardboard pan is discarded. Thus, the permanent plastic frame is reusable in subsequent pan assembly constructions with a fresh cardboard pan.

The above-mentioned products involve disposable methods and apparatus for containing and disposing of pet care needs, such as absorbent cat litter. However, a disadvantage in the Disposa-Box product is that the container is bulky and somewhat complicated to construct. Additionally, neither the Disposa-Box container nor the Valinsky litter pan include practical means for sealing or reclosing the box after use, thereby making the container bulky, rigid and difficult to dispose of. There is a hazard that soiled waste materials in the absorbent cat litter will contaminate people who are handling or are exposed to the absorbent cat litter material, because both the Disposa-Box and the Valinsky pans have no practical means for resealing or for containing the waste materials at the time of disposal.

The stiff containers include voids along with their contents, causing the containers to be larger than their contents. This is undesirable when containers are stacked upon one another because of the extra height required when stacked, and because the containers, not their contents, must bear the weight of the containers in the top of the stack. Further, products formed of relatively stiff corrugated cardboard are more difficult and slower to produce than products formed of flexible material, such as Kraft paper.

Other problems reside in the known prior art kitty litter pan products. For example, a problem in the LeJon litter pan construction is that upon use of the absorbent cat litter over a period of time, the permanent plastic frame usually must be cleaned and deodorized before reuse. This cleansing process can be undesirable because the frame construction includes ridges and valleys which might be hard to clean. Additionally, in the disposal state the cardboard pan remains rigid and awkwardly shaped, utilizing an excess amount of space in household waste receptacles or in landfills.

Therefore, a need exists for a pet toiletry system which includes a container that is strong and lightweight, prefilled with absorbent cat litter which functions as its own shipping and storage container, which can be opened to expose the absorbent cat litter to the cat, and to function as an absorbent receptacle for urine and excrement, and after use is sealable about the absorbent cat litter and excrement and is fully disposable and biologically degradable. It would also be desirable to provide a semirigid absorbent cat litter box construction which is designed for maintaining an erect and stable position during use, as well as creasing and folding to collapse around the used absorbent cat litter and the cat waste for disposal.

SUMMARY OF THE INVENTION

Briefly described, the present invention comprises a system for providing a convenient one-step approach to pet care needs, such as pet toiletry. A preferred embodiment of the invention comprises a collector or container formed of a semi-rigid material having creases on each of its corners for collapsing during preuse, filling, shipment and storage and later upon disposal, and for erection during use. The container is prefilled with a predetermined volume of absorbent cat litter. The container top wall has perforations and creases to allow sections of the top wall to tear and separate from each other, and to fold back reversibly to be positioned underneath the container. The construction of the preferred embodiment when erected for use comprises a partial double-walled underside so as to reinforce the stability of the container in its operational state and to insure that the container does not leak.

Adhesive tape strips can be installed underneath an opening and sealing tab for allowing the top wall sections to be folded back to their closed positions and allowing the receptacle to be properly sealed and secured when ready for disposal. Thus, when the cat has used the container for a period of time and saturated the absorbent cat litter, the container can be collapsed and the sections of the top wall replaced over the used cat waste and absorbent cat litter. At this time, the adhesive strip on the underside of the tab can be used to fasten the sections of the top wall together to prevent the contents of the container from spilling.

The container functions as its own shipping and storage container before it is opened for use. After use, the container is closed and once again functions as a container for the absorbent cat litter and the absorbed cat waste, all of which is biologically degradable and disposed of.

The present invention can include other embodiments, such as using a drawstring apparatus to pull open the top wall of the container to reveal the absorbent cat litter. This embodiment is also desirable for securing the contaminated absorbent cat litter after use and before disposal, whereby the drawstring pulls edges of the container together so as to avoid spillage of the absorbent material.

The material used to form the container can comprise heavy duty bag material, such as kraft paper material. This type of bag material is preferable for the present invention because of its lightweight characteristic and because of its sturdy nature and can be used in plys to increase the package strength and enhance the unit's operation. Moreover, during shipment of the container prefilled with absorbent cat litter, the absorbent cat litter can more easily conform to limited shipping areas during transportation. Likewise, the configuration of the absorbent cat litter will allow the container to conform to any adequate volume, thereby using less space in a landfill when the container is disposed.

Biodegradable material selected from the group consisting of: natural cellulosic materials such as fiberboard, cardboard, molded cellulose, paper stick, wood, particle board, and kraft paper material are other types of biodegradable and combustible materials preferred for the container of the present invention. If an incineration technique is used to dispose of the container and its wastes, the ashes evolving from burning the container will additionally yield substantially only biodegradable ash.

The present invention permits pet owners to purchase an entire self-contained disposable cat toiletry system, which includes a container that holds a predetermined amount of absorbent cat litter during preuse, shipment and storage, including a liner or protective liquid-repellant coating, and a premeasured amount of absorbent cat litter. At the point of manufacture, the container also can be formed with a liner within the container or can be treated with a substance which deodorizes and repels moisture. Problems such as coordinating and calculating the number of pounds of absorbent cat litter to purchase with respect to the number of plastic liners and number of plastic pans to purchase over a period of time are eliminated. Since pouring of the absorbent cat litter from a bag to a pan is not required, additional emission of dust will not occur from pouring the absorbent cat litter. After the cat uses the system, the entire container can be sealed and disposed of so as to avoid the hassle and health risk of having to dispose of the cat waste and absorbent cat litter and its liner, scrubbing the container or pan, relining the pan, and pouring another unmeasured amount of absorbent cat litter into the pan from a heavy bag of absorbent cat litter, thus eliminating or combining several laborious tasks into one.

It is, therefore, an object of the present invention to provide a package of premeasured amount of absorbent cat litter which includes a disposable container which when opened becomes a cat pan for receiving cat excrement, and after receiving the excrement can be closed to contain the waste for disposal.

Another object of the present invention is to provide an improved method of purchasing, utilizing, and disposing of predetermined amounts of absorbent cat litter.

A further object of the present invention is to provide an absorbent cat litter pan which can be formed from biodegradable materials for less impact on the environment during disposal.

Another object of the present invention is to provide a cat litter receptacle containing absorbent materials capable of absorbing moisture resulting from cat excrement, thereby eliminating the separate purchase of cat pan liners.

A further object of the present invention is to provide a compact, semi-rigid absorbent cat litter pan which functions as its own shipping and storage container and which is semi-collapsed in its shipping, preoperational state, and in its disposal state and can be erected when in use to take the shape of an open top container with upright side walls.

Another object of the present invention is to provide a prepackaged disposable system for pet care needs which is light in weight, convenient and manageable to pet owners.

A further object of the present invention is to provide an improved means for properly sealing a cat litter receptacle and its contaminated contents for disposal.

Another object of the present invention is to provide a cleaner and more sanitary means of caring for pet toiletry needs by eliminating the step of scrubbing and cleaning the containers for cat litter upon reuse of the container.

Another object of the present invention is to eliminate conventional waste of absorbent cat litter by providing standardized premeasured amounts absorbent cat litter within the receptacle.

A further object of the present invention is to eliminate the problems handling heavy, large bags of absorbent cat litter and of dust emission caused when the user fills the absorbent cat litter pan from large bulk absorbent cat litter bags.

A more complete understanding of the present invention will be had by those skilled in the art, as well as an appreciation of additional advantages, which will become apparent upon reading the following detailed description of the preferred embodiment and by examining the accompanying drawings.

DETAILED DESCRIPTION

Figure 1:
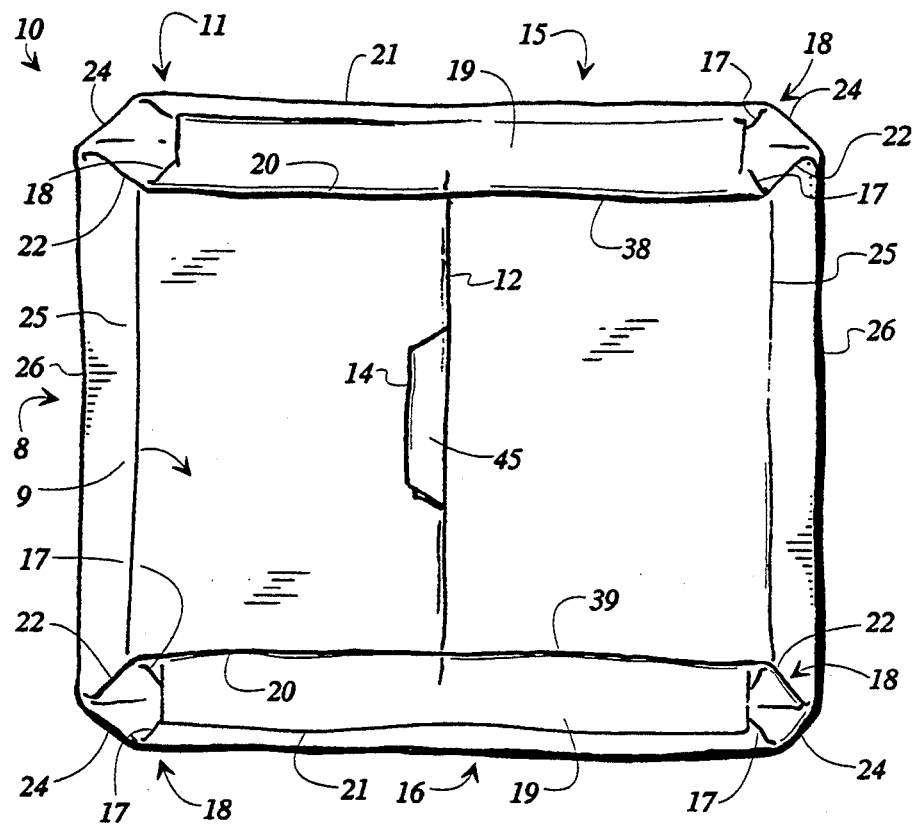
FIG. 1 is a plan view of a preferred embodiment of the disposable pet toiletry system.
Figure 2:
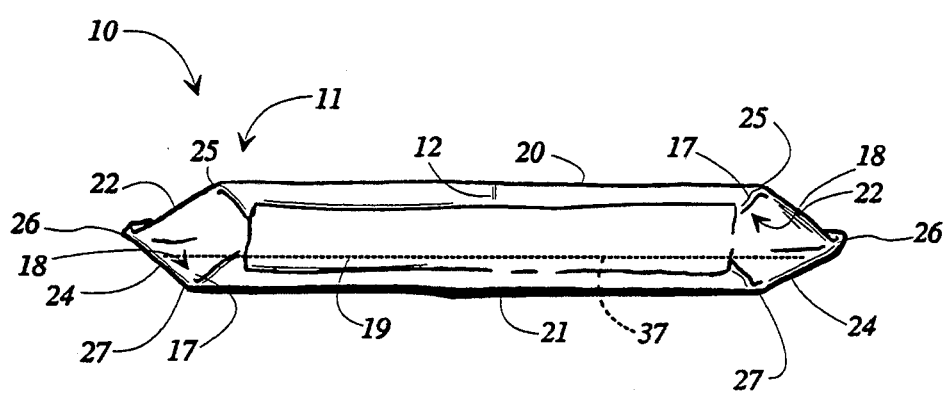
FIG. 2 is a side view of the disposable pet toiletry system of FIG. 1, taken along lines 2—2 of FIG. 1.
Figure 5:
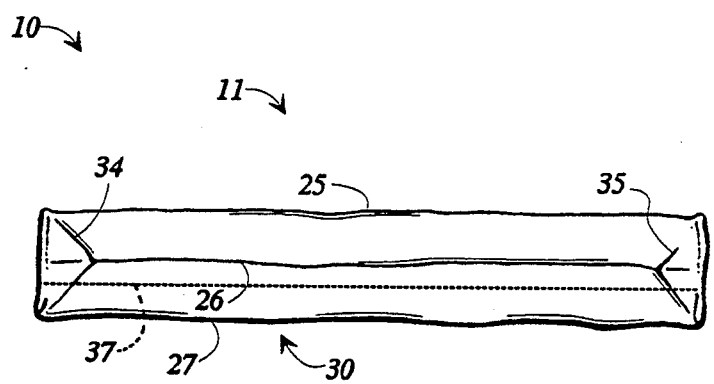
FIG. 5 is an end view of the embodiment of FIG. 1 in its expanded, erected state ready to be opened for use.
Figure 6:
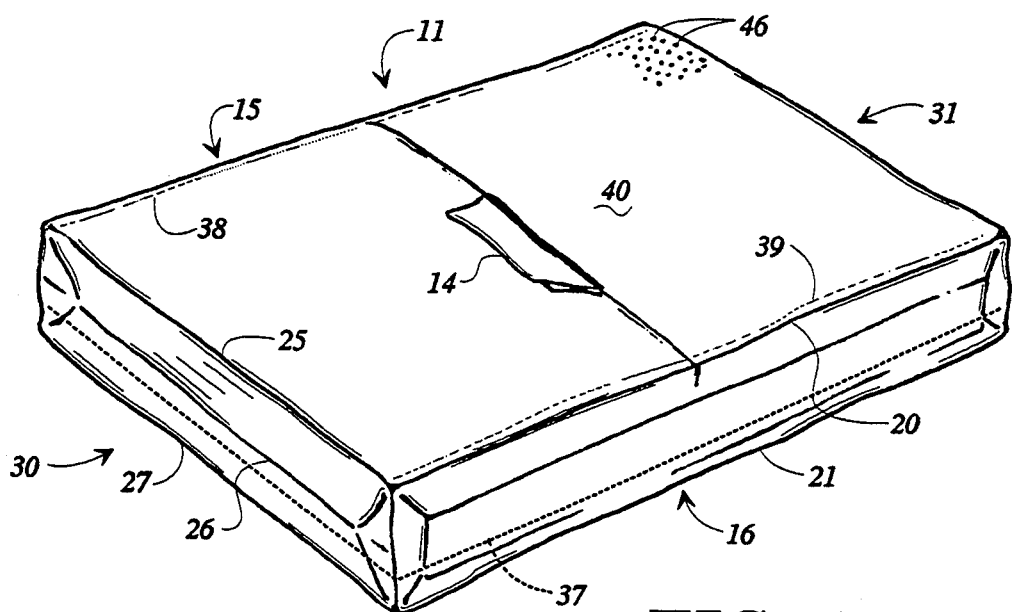
FIG. 6 is a perspective view of the embodiment of FIG. 1 in its expanded, erected state.
Figure 7:
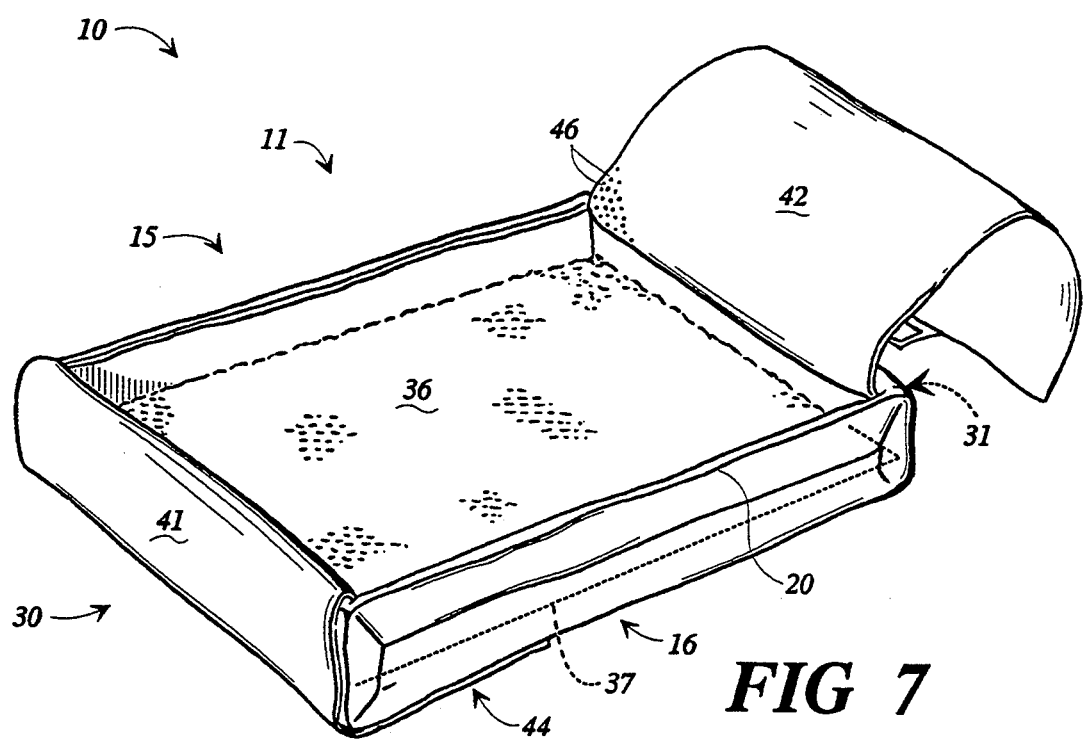
FIG. 7 is a perspective view of the embodiment of FIG. 1 when erected and its top walls opened, ready for use by the pet.

Referring now in more detail to the drawings, in which like numerals indicate like parts throughout the several views, FIGS. 1–7 illustrate the disposable pet utility system 10 comprising a generally rectangular collector or container 11. FIGS. 1 and 2 show the preferred embodiment of the housing or container 11 in its collapsed post-manufactured state, whereby the container is formed of a tubular 8 sheet of material 9. The tubular sheet of material has a seam 12, which connects the longitudinal edges of the sheet material and holds the sheet of material in a tubular shape 8, and a tab 14 is formed on the seam 12 which is the longitudinal axis of the tube 8. The ends of the tubular container are folded and pasted to form closed ends 15 and 16, which are a valved closure 18 with a cover flap 19 attached over the valved closure 18. The valved closure 18 comprises opposite and opposed folds 17 at the ends 15 and 16. The cover flap 19 further reinforces the closure and provides a more rigid configuration when the container 11 is erected (FIG. 6) and its top wall is opened (FIG. 7). Laterally extending creases 20 and 21 are formed adjacent and parallel to the cover flap 19 so that when the container is erected for use, inner and outer creases 22 and 24 are also formed on each corner of the ends 15 and 16 for allowing the container to collapse as shown in FIGS. 1 and 2.

Figure 3:
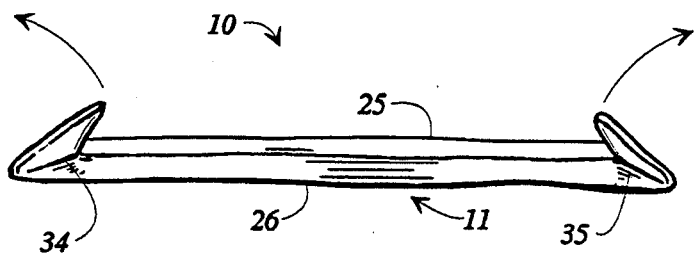
FIG. 3 is an end view of the embodiment of FIG. 1 in its collapsed state for storage and shipment.
Figure 4:
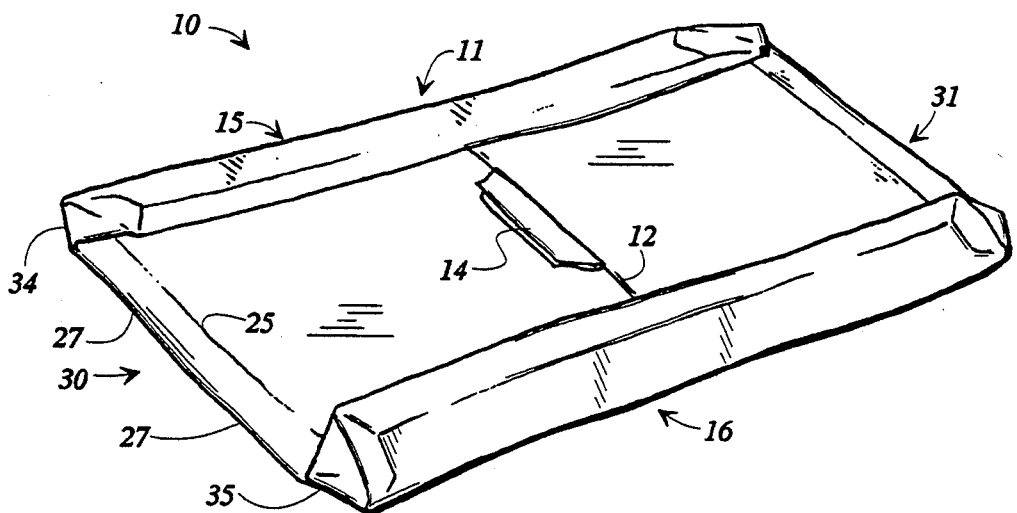
FIG. 4 is a perspective view of the embodiment of FIG. 1 in its collapsed state.

The circular portion of the tube 8 of material 9 can then be creased at crease lines 25, 26 and 27 so that the container 11 can be expanded and form two opposite and opposed shorter side walls 30, 31 to form a more rigid and stable container, as shown in FIGS. 3–6. Additionally, opposite and opposed creases 34 and 35 at edges of the shorter side walls 30 and 31 allow the container to deflate so as to become more compact and to be easier to handle and disposed of (FIGS. 3–5).

As shown in FIG. 7, absorbent cat litter 36 is prepackaged within a holding chamber 13 of the container 11. During manufacturing of the container 11, a premeasured level 37 of absorbent cat litter 36 is dispensed into the container so as to eliminate the guess work currently involved in the amount of absorbent cat litter to use.

As shown in FIG. 1, the system also includes a pair of laterally extending score lines 38 and 39 adjacent and parallel to the laterally extending creases 20 of the container. When the container is erected as shown in FIG. 6, the boundaries formed by intersecting creases 20 and 25 form a top wall 40 of the container, as well as the bottom wall of the unit, as shown in FIG. 7. In order to reveal the absorbent cat litter 36, a user of the system pulls the tab 14 so as to split the seam 12. The top wall then splits into two sections 41 and 42 (FIG. 7) by tearing at the score lines 38 and 39. The two sections 41 and 42 then can be reversibly folded over and about the short side walls 30 and 31, respectively. A partial double-bottom wall configuration 44 is achieved in this preferred embodiment, which provides less of an opportunity for liquids or wastes to leak through the container and onto an exterior surface (FIG. 6).

An adhesive means 45 is placed on the underside of the tab 14 so that when the disposable pet utility system 10 has been used, the adhesive means 45 can be exposed to seal the sections 41 and 42 together so as to reform the top wall 40. The adhesive means 45, therefore, allows the system to be resealed and secured in order to avoid leaking of the contents of the container during disposal.

The disposable pet utility system 10 is generally purchased in its collapsed, compact state, as shown FIGS. 1 and 3. The user takes the container and the contents home and erects the container 11 by unfolding the ends 15 and 16, thereby unfolding the creases 34 and 35 of the shorter side walls 30 and 31. The system would now resemble the expanded container 11, as shown in FIG. 6. In order to reveal the absorbent cat litter 36, the user lifts the tab 14 and tears along the score lines 38 and 39 to separate sections 41 and 42 of the top wall 40. The sections 41 and 42 reversibly fold over and about the erected short end side walls 30 and 31, as shown in FIG. 7. The cat would then use the absorbent cat litter 36 for a designated amount of time.

When the absorbent cat litter 36 has absorbed cat waste to its capacity, the sections 41 and 42 of the top wall 40 are replaced over the absorbent cat litter and the collected cat excrement and the cover sheet of the adhesive strip is peeled away so as to expose the adhesive 45 and the flap is pressed against the opposite top wall section so as to seal the sections 41 and 42 together. The entire container is then deflated and collapsed back to is packaged state (FIGS. 1 and 3) whereby disposal is sanitary and convenient.

The present invention can include perforations or air holes 46 for the release of air during the pre-filling of the absorbent cat litter 36 during manufacturing (FIGS. 1, 6 and 7). Usually, however, the score lines 38 and 39 will provide enough of an outlet for air during the pre-filling process.

The present invention can also include another embodiment (not shown) which incorporates the use of a drawstring apparatus to form the opening of the top wall The drawstring which is a substitute for the tab 14 can thereby open the disposable pet utility system.

Preferably, the material from which the housing or container is fabricated is of a cellulose base which is biodegradable. Preferred cellulosic material can be formed of a group of materials, selected from fiberboard, cardboard, molded cellulose, paper stock, kraft paper, wood, and particle board. The absorbent cat litter is primarily formed of clay. Thus, the entire disposable pet toiletry system with its contents before and after use is biodegradable and combustible. Additionally, should future regulations require an incineration technique to dispose of the used pet toiletry systems, the housing and wastes deposited in the housing will yield substantially only biodegradable ash upon incineration.

While this invention has been described in relation to the preferred embodiment, it will be apparent to those skilled in the art that the invention is susceptible to additional embodiments without departing from the spirit and scope of the invention. Therefore, it is intended that the invention not be limited except by the claims.

I claim:

1. A disposable toiletry system for pets comprising:
 a flexible collapsible container formed of biodegradable kraft paper for shipping and storing cat litter and for independent use as semi-rigid cat litter pan;
 absorbent cat litter enclosed in said container;
 said container including opposed side walls and end walls, a bottom wall and a top wall, said side walls and end walls being foldable to allow said top wall to collapse about the cat litter toward said bottom wall so that the cat litter bears the weight of objects resting on the container during shipment and storage of the container and its contents;
 said top wall defining separation means for opening said top wall to form an open top container with at least one side flap that is foldable to a position extending about the side and beneath the container;
 said side walls and end walls being unfoldable to upright positions to erect the container and to contain the cat litter and to form a semi-rigid cat litter pan;
 so that when the top wall of the container is opened and the side flap is folded about the container and the side walls and end walls are unfolded to rigidify the container the container functions as a semi-rigid cat litter pan.

* * * * *